July 7, 1936.   B. H. SMITH   2,046,534
WIRE SCOOP
Filed Dec. 21, 1934   2 Sheets-Sheet 1
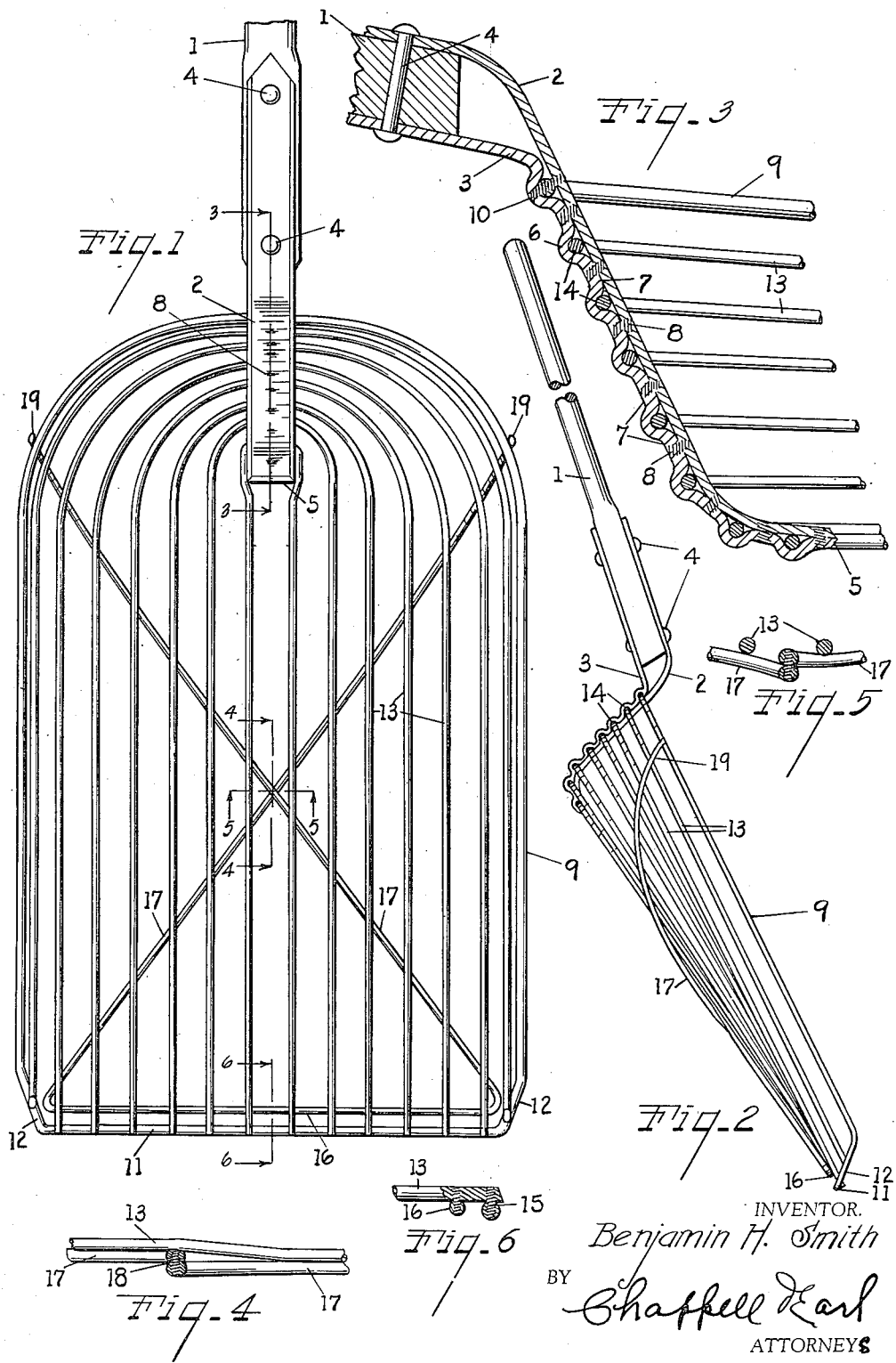

July 7, 1936.  B. H. SMITH  2,046,534
WIRE SCOOP
Filed Dec. 21, 1934   2 Sheets-Sheet 2
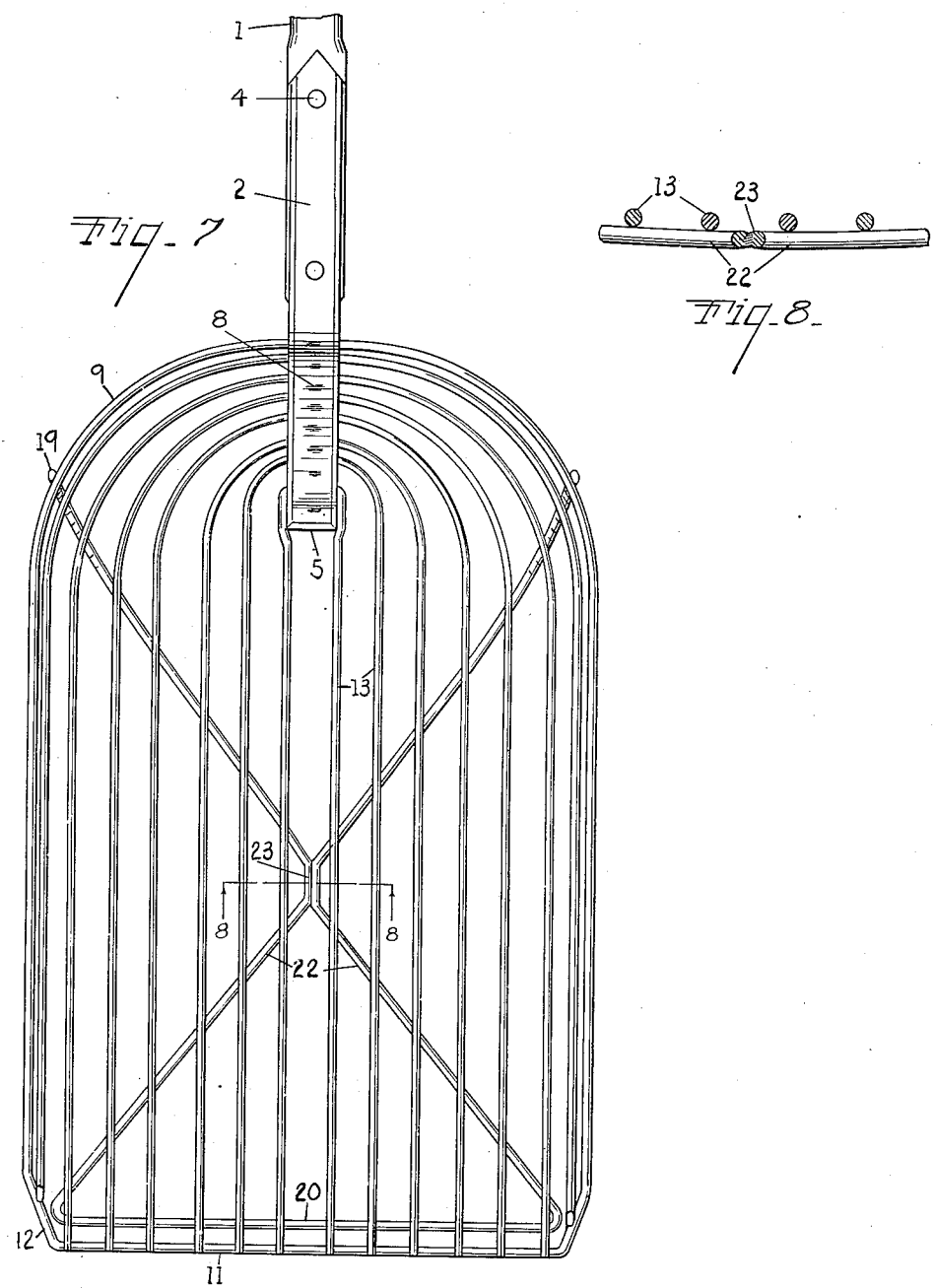
INVENTOR.
Benjamin H. Smith
BY
Chappell Earl
ATTORNEYS Patented July 7, 1936

2,046,534

UNITED STATES PATENT OFFICE 2,046,534

WIRE SCOOP

Benjamin H. Smith, Niles, Mich., assignor to Michigan Wire Goods Company, Niles, Mich.

Application December 21, 1934, Serial No. 758,537

8 Claims. (Cl. 209—419)

The main objects of this invention are:

First, to provide an improved wire scoop or shovel adapted as a sifting shovel for sifting ashes and the like or for the handling of vegetables or other materials.

Second, to provide a structure of this character which may be formed of relatively light stock and at the same time is very strong and rigid and very durable.

Third, to provide a structure of this character with a bracing and wear member that adds very materially to the life of the scoop without greatly adding to its cost.

Objects relating to details and economies of my invention will appear from the description to follow. The invention is defined and pointed out in the claims.

A structure which is a preferred embodiment of my invention is illustrated in the accompanying drawings, in which:

Fig. 1 is a top plan view of a scoop embodying the features of my invention, the handle being partially broken away.

Fig. 2 is a side view with the handle partially broken away.

Fig. 3 is an enlarged fragmentary view on line 3—3 of Fig. 1.

Fig. 4 is an enlarged fragmentary view sectioned on line 4—4 of Fig. 1.

Fig. 5 is an enlarged fragmentary view sectioned on line 5—5 of Fig. 1.

Fig. 6 is an enlarged fragmentary view sectioned on line 6—6 of Fig. 1.

Fig. 7 is a plan view of a slightly modified form or embodiment of my invention, the handle being partially broken away.

Fig. 8 is an enlarged detail section on line 8—8 of Fig. 7.

Referring to the drawings, the handle 1, in the structure illustrated, is formed of wood. The shank is formed of a pair of strap-like members 2 and 3 lapped at the top and bottom of the handle respectively and secured thereto by rivets 4. These shank members extend downwardly and forwardly and terminate in a forwardly projecting nose portion 5.

The rear shank member 3 has a series of corrugation-like loops 6 formed therein, the inwardly extending loops or corrugations 7 being secured to the forward shank member by electric welding as indicated at 8.

I provide a border frame member 9 formed of quite heavy gauge wire bent or looped upon itself with its ends disposed in the upper opening of the shank formed by the loops as described and preferably welded to both shank members as indicated at 10. The bight portion 11 of this border frame member is downwardly offset at 12, this bight portion constituting a front cross piece for the shovel.

I provide a series of U-bar members 13 of graduated or varying sizes arranged within the border frame member so that the arms form longitudinally extending bars of a grid-like shovel body or blade. The bight portions 14 are arranged in the loop of the shank and clamped therein, the parts being preferably assembled before the electric welding so that there is a distinct clamping action effectively holding the bar members against movement. The ends of the bar members are lapped upon and welded to the front cross bar 11, as shown at 15, Fig. 6.

I provide a combined reinforcing and wear member formed of a piece of wire bent to provide a front cross piece 16 which is disposed at the rear of the front cross piece 11 and parallel thereto and welded to the bars 13.

The arms 17 are arranged in crossed relation and diagonally of the shovel bars, these arms being welded together at their crossing point as indicated at 18 and to the bars. The ends 19 are conformed to fit the curved portion of the shovel which they overlap and are brought up and welded to the border frame.

This provides a simple but very effective reinforcing means, preventing spreading or distortion of the bars and effectively holding the front ends of the bars even in the event that one of them should, through severe usage, become detached from the front cross piece 11 as sometimes occurs through severe usage or as a result of the end of the bar becoming caught on some object and wrenched in an effort to disengage it. The brace members are positioned to receive the wear, particularly where the shovel is used as a sifter and spade—for example, on the bottom of an ashpit.

The embodiment shown in Fig. 7 is the same as that described except that the bracing and reinforcing member comprises a front cross piece 20 and arms 22 which are of general V-shape brought together at their apex 23 and spot welded instead of being crossed as shown in the preferred embodiment. The arms are, however, diagonally disposed and very effective bracing results. The parts are likewise arranged to effectively receive the wear.

I have illustrated and described my improvements in embodiments which I find very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. In a wire scoop, the combination with a handle, of a pair of shank members secured to said handle and projecting downwardly and forwardly therefrom, the rear shank member having a series of corrugation-like loops therein, a border frame member bent upon itself with its bight portion offset downwardly and constituting a front cross bar and having its ends disposed between said shank members and welded thereto, U-shaped bar members arranged within said frame member, one within the other in spaced relation and with their bights disposed between said shank members and engaged in the loops of the rear member, said shank members being welded together between said loops whereby said bar members are fixedly clamped between said shank members, the forward ends of said bar members being superimposed upon and welded to said front cross bar, and a combined brace and wear member formed of a single rod bent to provide a front cross member and crossed arms, the front cross member being disposed at the rear of said front cross bar and welded to said bar members, the crossed arms being disposed in diagonally crossing relation to said bar members and welded thereto, the rear ends of the arms of the reinforcing members being conformed to the sides of the scoop and being welded to the border frame adjacent the rear ends of its side portions.

2. In a wire scoop, the combination with a handle, of a pair of shank members secured to said handle and projecting downwardly and forwardly therefrom, a border frame member bent upon itself with its bight portion constituting a front cross bar and having its ends disposed between said shank members and welded thereto, U-shaped bar members arranged within said frame member, one within the other, in spaced relation and with their bights disposed between said shank members and secured thereto, the forward ends of said bar members being superimposed upon and welded to said front cross bar, and a combined brace and wear member formed of a single rod bent to provide a front cross member and crossed arms, the front cross member being disposed at the rear of said front cross bar and welded to said bar members, the crossed arms being disposed in diagonally crossing relation to said bar members and welded thereto, the rear ends of the arms of the reinforcing members being conformed to the sides of the scoop and being welded to the border frame adjacent the rear ends of its side portions.

3. In a wire scoop, the combination with a handle, of a pair of shank members secured to said handle and projecting downwardly and forwardly therefrom, the rear shank member having a series of corrugation-like loops therein, a border frame member bent upon itself with its bight constituting a front cross bar and having its ends disposed between said shank members and welded thereto, U-shaped bar members arranged within said frame member, one within the other, in spaced relation and with a portion disposed between said shank members and engaged in the loops of the rear member, said shank members being welded together between said loops whereby said bar members are fixedly clamped between said shank members, the forward ends of said bar members being superimposed upon and welded to said front cross bar, and a combined brace and wear member comprising a front cross member and diagonal arms, the front cross member being disposed at the rear of said front cross bar and welded to said bar members, the diagonal arms being disposed in diagonally crossing relation to said bar members and welded thereto at their crossing points.

4. In a wire scoop, the combination with a handle, of a pair of shank members secured to said handle and projecting downwardly and forwardly therefrom, a border frame member bent upon itself with its bight constituting a front cross bar and having its ends disposed between said shank members and welded thereto, U-shaped bar members arranged within said frame member, one within the other, in spaced relation and with a portion disposed between said shank members and secured thereto, the forward ends of said bar members being superimposed upon and welded to said front cross bar, and a combined brace and wear member comprising a front cross member and diagonal arms, the front cross member being disposed at the rear of said front cross bar and welded to said bar members, the diagonal arms being disposed in diagonally crossing relation to said bar members and welded thereto at their crossing points.

5. In a wire scoop, the combination with a handle, of a shank projecting downwardly and forwardly therefrom, a border frame member bent upon itself with its bight constituting a front cross bar and having its ends secured to said shank, bar members arranged within said frame member, one within the other, in spaced relation with their front ends upon and secured to said front cross bar and their rear ends secured to said shank, and a combined brace and wear member formed of a single rod bent to provide a front cross member and crossed arms, the front cross member being disposed at the rear of the front cross bar and secured to said bar members, the crossed arms being disposed in diagonally crossing relation to said bar members and secured thereto, the rear ends of the arms being conformed to the sides of the scoop and secured to the border frame member.

6. In a wire scoop, the combination with a handle, of a shank projecting downwardly and forwardly therefrom, a border frame member bent upon itself with its bight constituting a front cross bar and having its ends secured to said shank, bar members arranged within said frame member, one within the other, in spaced relation with their front ends upon and secured to said front cross bar and their rear ends secured to said shank, and a combined brace and wear member comprising a front cross member and crossed arms, the front cross member being disposed at the rear of the front cross bar and secured to said bar members, the crossed arms being disposed in diagonally crossing relation to said bar members and secured thereto, the rear ends of the arms being conformed to the sides of the scoop and secured to the border frame member.

7. In a wire scoop, the combination with a handle, of a shank projecting downwardly and forwardly therefrom, a border frame member bent upon itself with its bight constituting a front cross bar and having its ends secured to said shank, bar members arranged within said frame member, one within the other, in spaced relation with their front ends upon and secured to said front cross member and their rear ends secured to said shank, and a combined brace and wear member comprising a front cross member and arms disposed diagonally beneath and secured to said bar members, the front cross member being disposed at the rear of and in parallel relation to said front cross bar and secured to said bar members.

8. In a wire scoop, the combination of a handle shank, a border frame member formed to provide a front cross bar, U-shaped bar members secured to said shank, and a combined brace and wear member comprising a front cross member and arms disposed diagonally beneath and welded to said bar members, the front cross member being disposed at the rear of and in parallel relation to said front cross bar and being welded to said bar members.

BENJAMIN H. SMITH.